US008495682B2

(12) United States Patent
Dierks et al.

(10) Patent No.: US 8,495,682 B2
(45) Date of Patent: Jul. 23, 2013

(54) EXPOSURE BASED CUSTOMIZATION OF SURVEYS

(75) Inventors: Timothy M. Dierks, Brooklyn, NY (US); Geoffrey R. Smith, San Jose, CA (US); Pradipta Mitra, Rutherford, NJ (US)

(73) Assignee: Google Inc., Mountain View, CA (US)

( * ) Notice: Subject to any disclaimer, the term of this patent is extended or adjusted under 35 U.S.C. 154(b) by 341 days.

(21) Appl. No.: 12/732,905

(22) Filed: Mar. 26, 2010

(65) Prior Publication Data

US 2011/0239243 A1 Sep. 29, 2011

(51) Int. Cl.
H04H 60/32 (2008.01)
H04N 5/445 (2011.01)
G06Q 30/00 (2012.01)

(52) U.S. Cl.
USPC .............................. 725/46; 725/13; 705/14.44

(58) Field of Classification Search
USPC .............................. 725/34, 46, 13; 705/14.44
See application file for complete search history.

(56) References Cited

U.S. PATENT DOCUMENTS

| | | | | |
|---|---|---|---|---|
| 6,236,975 B1 * | 5/2001 | Boe et al. | ...................... | 705/7.32 |
| 6,581,071 B1 * | 6/2003 | Gustman et al. | ................... | 725/9 |
| 7,194,425 B2 * | 3/2007 | Nyhan et al. | ............... | 705/14.44 |
| 7,487,435 B2 * | 2/2009 | Aviv | .............................. | 715/205 |
| 7,574,374 B2 * | 8/2009 | Nyhan et al. | ............... | 705/14.44 |
| 7,949,561 B2 * | 5/2011 | Briggs | ......................... | 705/14.41 |
| 7,984,468 B2 * | 7/2011 | Westberg | ......................... | 725/46 |
| 8,112,310 B1 * | 2/2012 | Yehoshua et al. | .......... | 705/14.42 |
| 8,229,788 B2 * | 7/2012 | Nyhan et al. | ............... | 705/14.41 |
| 2001/0018668 A1 * | 8/2001 | Yanase et al. | ................... | 705/14 |
| 2002/0161637 A1 * | 10/2002 | Sugaya | ........................... | 705/14 |
| 2004/0204983 A1 * | 10/2004 | Shen et al. | ....................... | 705/10 |
| 2005/0149964 A1 * | 7/2005 | Thomas et al. | .................... | 725/9 |
| 2006/0129457 A1 * | 6/2006 | Nyhan et al. | ................... | 705/14 |
| 2007/0055985 A1 * | 3/2007 | Schiller et al. | .................. | 725/34 |
| 2007/0156532 A1 * | 7/2007 | Nyhan et al. | ................... | 705/14 |
| 2007/0192161 A1 * | 8/2007 | Kogan et al. | .................... | 705/10 |
| 2007/0276729 A1 * | 11/2007 | Freer | .............................. | 705/14 |

(Continued)

FOREIGN PATENT DOCUMENTS

| | | |
|---|---|---|
| JP | 11259558 A | 9/1999 |
| JP | 2006048658 A | 2/2006 |
| KR | 2001097357 A | 11/2001 |

OTHER PUBLICATIONS

Notification of Transmittal of the International Search Report and the Written Opinion of the International Searching Authority, or the Declaration for PCT/US2011/029888 dated Nov. 30, 2011.

*Primary Examiner* — James R Sheleheda
(74) *Attorney, Agent, or Firm* — Dickinson Wright PLLC

(57) ABSTRACT

Methods, systems, and apparatus, including computer programs encoded on a computer storage medium, for panel surveys. In one aspect, a method include accessing television history data for viewing devices associated with panelists and that describes, for each viewing device, television advertisements that were presented by use of the viewing device; a proper subset of panelists are selected based on the determinations of television advertisements that were presented and television advertisements that were not presented by use of the viewing device associated with the panelists, and for each of the selected panelists, a survey for the panelist is generated, the survey including one or more questions, each of the questions having been selected based on the television advertisements that were presented and television advertisements that were not presented by use of the viewing device associated with the panelist.

21 Claims, 7 Drawing Sheets

U.S. PATENT DOCUMENTS

| | | | |
|---|---|---|---|
| 2008/0040205 A1* | 2/2008 | Gold et al. | 705/10 |
| 2008/0126173 A1* | 5/2008 | Crysel et al. | 705/10 |
| 2008/0313010 A1* | 12/2008 | Jepson et al. | 705/10 |
| 2009/0030787 A1* | 1/2009 | Pon et al. | 705/14 |
| 2009/0150217 A1* | 6/2009 | Luff | 705/10 |
| 2009/0157483 A1* | 6/2009 | Otto et al. | 705/10 |
| 2009/0204476 A1* | 8/2009 | Abraham et al. | 705/10 |
| 2009/0228338 A1* | 9/2009 | Brandman et al. | 705/10 |
| 2009/0249388 A1* | 10/2009 | Seidel et al. | 725/32 |
| 2009/0254935 A1* | 10/2009 | Shah-Nazaroff et al. | 725/24 |
| 2009/0265215 A1* | 10/2009 | Lindstrom | 705/10 |
| 2009/0265236 A1* | 10/2009 | Schultz et al. | 705/14 |
| 2009/0276309 A1* | 11/2009 | Otto et al. | 705/14.25 |
| 2009/0307083 A1* | 12/2009 | Nyhan et al. | 705/14.44 |
| 2010/0004987 A1* | 1/2010 | Benschop | 705/14.13 |
| 2010/0049584 A1* | 2/2010 | Mehta et al. | 705/10 |
| 2010/0094709 A1* | 4/2010 | Kuroda | 705/14.58 |
| 2010/0262462 A1* | 10/2010 | Tryfon | 705/10 |
| 2010/0324971 A1* | 12/2010 | Morsberger | 705/10 |
| 2011/0004508 A1* | 1/2011 | Huang et al. | 705/10 |
| 2011/0137721 A1* | 6/2011 | Bansal | 705/14.41 |
| 2011/0145056 A1* | 6/2011 | Sullivan et al. | 705/14.41 |
| 2011/0153387 A1* | 6/2011 | Ma | 705/7.32 |
| 2011/0239243 A1* | 9/2011 | Dierks et al. | 725/14 |
| 2011/0313814 A1* | 12/2011 | Briggs | 705/7.31 |
| 2011/0320260 A1* | 12/2011 | Briggs | 705/14.42 |
| 2012/0010924 A1* | 1/2012 | Piliouras | 705/7.32 |
| 2012/0084801 A1* | 4/2012 | Rowe et al. | 725/14 |
| 2012/0084828 A1* | 4/2012 | Rowe et al. | 725/110 |
| 2012/0089455 A1* | 4/2012 | Belani et al. | 705/14.44 |
| 2012/0109711 A1* | 5/2012 | Boe et al. | 705/7.31 |
| 2012/0130802 A1* | 5/2012 | Shimizu | 705/14.44 |
| 2012/0143675 A1* | 6/2012 | Aviv et al. | 705/14.44 |
| 2012/0179536 A1* | 7/2012 | Kalb et al. | 705/14.43 |
| 2012/0278131 A1* | 11/2012 | Jepson et al. | 705/7.32 |
| 2013/0018719 A1* | 1/2013 | Abraham et al. | 705/14.41 |
| 2013/0019258 A1* | 1/2013 | Bhatia et al. | 725/13 |
| 2013/0024879 A1* | 1/2013 | Bruich et al. | 725/9 |
| 2013/0046613 A1* | 2/2013 | Farahat et al. | 705/14.43 |
| 2013/0046614 A1* | 2/2013 | Nyhan et al. | 705/14.44 |
| 2013/0060602 A1* | 3/2013 | Rupp et al. | 705/7.29 |

\* cited by examiner

EXPOSURE BASED CUSTOMIZATION OF SURVEYS

BACKGROUND

This specification relates media surveys.

Advertisers often advertise on both the Internet and television. With respect to Internet advertising, advertisers can participate in auctions for placement of advertisements with search result or on web pages of particular content, or can reserve placements of advertisements in advance. With respect to television advertisements, advertisers purchases airtime during a television broadcast to air television advertisements.

A common performance metric for advertisements is impressions. As used herein, an impression is a counting of a viewing of an advertisement. For web-based advertisements, the impressions and actions taken can be readily tracked by advertisers, advertising management systems, and the web page publishers. For television advertisements, there are systems that analyze reporting logs of set top boxes and the like to enable the counting of impressions. These systems define one or more criteria for viewing interactions that must be met to count an impression. For example, a system that processes set top logs reported by set top boxes may only count an impression when the viewing device is tuned to a broadcast stream in which an advertisement is inserted during the advertisement spot, and the viewing device remains tuned to the broadcast stream for N consecutive seconds during the actual display time of the insertion.

While such systems can accurately determine whether an advertisement was shown on particular television or computer, it is nevertheless difficult to determine with absolute certainty that a viewer actually viewed an advertisement. For example, the viewer may have left the room during a television commercial break and returned after the sponsor programming resumed.

In addition to impressions, advertisers are also very interested in the effectiveness of their advertisements and/or advertising campaigns. For example, advertisers often want to know how many times they need to show an advertisement to a person in a target demographic before the person will be remember the brand name. One technique for evaluating the effectiveness of an advertisement and/or advertising campaign is to survey an audience for advertisement recognition and brand linkage. The measure of advertisement recognition can, for example, be based on the percentage of a survey audience that recognizes the advertisement, and the measure of brand linkage can, for example, be based on the percentage of the survey audience that correctly identifies the featured product and/or brand of the advertisement.

To process the surveys accurately and efficiently, advertisers prefer to survey individuals whose viewing habits are known with respect to particular advertisements. For example, the accuracy of findings from the survey results is increased if the advertiser knows which of viewers being surveyed actually saw the advertisement, how many times each viewer saw the advertisement, and which viewers being surveyed did not see the advertisement. Unfortunately, many viewers need to be surveyed because their viewing habits are not known a priori. Thus, to ensure a large enough sample of relevant viewers are surveyed, the number of viewers that must be contacted is far in excess of the minimum sample set size. Accordingly, unless the advertising campaign is truly enormous, a standard practice of random-digit-dialing to find people who were exposed to the advertisements and are willing to take surveys will have an extremely high miss rate, making the survey process inefficient for all but the largest campaigns Likewise, it is difficult to obtain an accurate exposure count, as the clarity and length of recall induced by advertising depends significantly on the number of times a prospective customer was exposed to the advertisement. It is difficult for viewers to accurately recall, when prompted during a survey, the number of times they may have viewed the advertisement. Furthermore, these errors can introduce false negatives, i.e., people who were exposed but do not remember the exposure, and people who were not exposed but incorrectly recall an exposure.

Current surveys also require significant scheduling and management overhead. To minimize the difficulties described above, advertisers often need to generate media plans solely for getting accurate recall data. For example, advertisers schedule specific spot counts in different demographic marketing areas (DMAs), rather than running a media plan that they would expect to be most effective.

Finally, if an advertiser is partnering with a third party survey operator to perform recall surveys, various aspects of the advertising campaign, e.g., flighting dates and the creative itself, must be communicated to the survey operator so that they can be processed into a set of questions and a service management plan. This requires additional overhead and expense.

SUMMARY

This specification describes technologies relating exposure-based customized surveys. A survey system integrates with advertising planning and delivery services managed by an advertisement system, and automatically generates surveys from advertising exposure data and deploys the surveys for advertisements and campaigns to individuals based on exposure data that identifies potential exposures to each of the individuals.

In general, one innovative aspect of the subject matter described in this specification can be embodied in methods that include the actions of accessing television history data for viewing devices, each of the viewing devices being associated with a corresponding panelist, the television history data describing, for each viewing device, television advertisements that were presented by use of the viewing device; determining, for each panelist, television advertisements that were presented by use of the viewing device associated with the panelist; determining, for each panelist, television advertisements that were not presented by use of the viewing device associated with the panelist; selecting a proper subset of the panelists, each selected panelist in the proper subset of panelists being selected based on the determinations of television advertisements that were presented and television advertisements that were not presented by use of the viewing device associated with the panelist; for each of the selected panelists, generating a survey for the panelist, the survey including one or more questions, each of the questions having been selected based on the television advertisements that were presented and television advertisements that were not presented by use of the viewing device associated with the panelist; and receiving responses to the selected surveys from the selected panelists. Other embodiments of this aspect include corresponding systems, apparatus, and computer programs, configured to perform the actions of the methods, encoded on computer storage devices.

In general, another aspect of the subject matter described in this specification can be embodied in methods that include the actions of accessing exposure data for viewing devices, each of the viewing devices being associated with a corresponding panelist, the exposure data describing, for each viewing device, advertisements that were presented by use of the viewing device; determining, for each panelist, advertisements that were presented by use of the viewing device associated with the panelist; determining, for each panelist, advertisements that were not presented by use of the viewing device associated with the panelist; selecting a proper subset of the panelists, each selected panelist in the proper subset of panelists being selected based on the determinations of advertisements that were presented and advertisements that were not presented by use of the viewing device associated with the panelist; for each of the selected panelists, generating a survey for the panelist, the survey including one or more questions, each of the questions having been selected based on the advertisements that were presented and advertisements that were not presented by use of the viewing device associated with the panelist; and receiving responses to the selected surveys from the selected panelists. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. Surveys can be targeted to viewers based on the knowledge that the viewer had an opportunity to view an advertisement (i.e., the advertisement was presented on a device associated with the viewer) or did not have an opportunity to view the advertisement (i.e., the advertisement was not presented on a device associated with the viewer), thus reducing the survey miss rate and increasing the return on investment (ROI) of the survey. Survey responses can be compared to exposure data that specifies, for each viewing and/or browsing device, advertisements that were presented by use of the devices, and biases can be determined. Survey participants ("panelists") can be grouped into subsets based on whether a panelist was exposed to the advertisement and/or the number of times the panelists was exposed to the advertisement. Each subset can thus be provided customized surveys based on the exposure data for that subset. Panelists can also be grouped by demographic data to increase the actionability of the survey. The demographic data can be classic demographic data, such as gender, age, income level, persons identified in a particular list, etc., or can be behavioral demographic data derived from the panel data itself (e.g., a panelists that stopped watching a first program when a host departed, or panelists who use their computers while watching television, etc.).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

A survey system maintains a panelist-level database that tracks advertisement exposures on an individual panelist basis. The advertisement exposures are determined from exposure data, such as television history data from set top box logs of panelists, and browsing data from panelist computers. Advertisement exposures can be determined by third parties, other systems, or even be determined by the survey system. The system generates and delivers individualized surveys to panelists based on the advertisements that have been presented on devices, such as televisions and/or computers, for each panelist.

§1.1 Example Survey Environment

Figure 1:
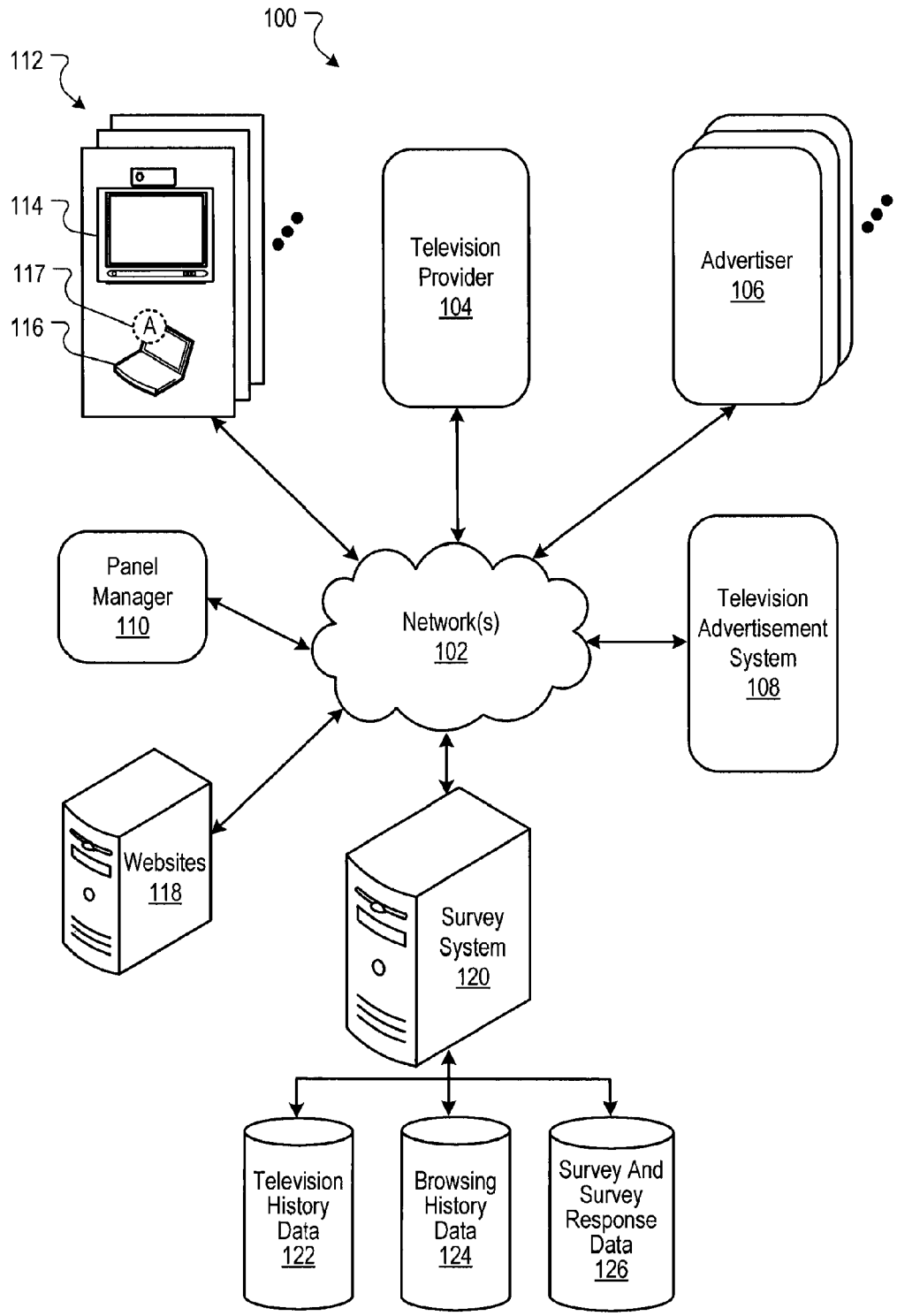
FIG. 1 is a block diagram of an environment in which media surveys are conducted.

FIG. 1 is a block diagram of an environment 100 in which media surveys are conducted. One or more communication networks 102 provide data communication paths between s television provider 104, advertisers 106, a television advertising system 108, s panel manager 110, panelists 112, websites 118, and a survey system 120. The communication networks 102 include a variety of different communication mediums, such as the Internet, cable networks, satellite networks, and telephone networks.

The television provider 104 is an entity that provides television broadcasting services. Example television providers include cable providers, digital satellite providers, streaming media providers, or some other providers of television content. The web site 118 is one or more resources associated with a domain name and hosted by one or more servers. An example web site is a collection of web pages formatted in the hypertext markup language (HTML). Web pages can contain text, images, and multimedia content.

Each of the advertisers 106 is an entity that provides television advertisements, e.g., a commercial entity that sells products or services, an advertising agency, or a person. An advertiser 106 can purchase advertisement spots, e.g., times during television programming during which a television commercial is aired, or one or more advertisement slots on the webpages served by the websites 118. The advertisers can purchase these advertisement spots directly from the television provider 104 and the websites 118, or can purchase the advertisements by use of the television advertisement system 108.

In some implementations, the television advertisement system 108 conducts an auction through which the advertisement spots are purchased. In other implementations, the television advertisement system 108 facilitates the purchasing of reservations for advertisement spots with the television provider 104 and the websites 118. The advertisements are presented on televisions 114 and computers 116.

A panel manager 110 is an entity that recruits and or solicits panelists 112 to take part in advertisement surveys. The panel manager 110 receives requirements from the advertisers 106 and, optionally, the television provider 104 to conduct advertisement surveys. As used herein, and advertisement survey includes one or more questions for a panelist, and each of the questions is selected based on advertisements that were presented and/or advertisements that were not presented by use of television viewing devices 114 and/or computer devices 116 associated with the panelist. The panelist is a person that has agreed to be contacted to take part in frequent or infrequent surveys. Typically, the panelist has agreed to allow the survey system 120 to process his or her television history data, e.g., set top logs, and web history data, e.g., browsing data, to determine which advertisements are presented by use of televisions 114 and computers 116 associated with the panelist. This data can be gathered by use of a unique set top box identifier associated with the panelists, and by use of a software agent 117 installed on the computer associated with the panelist. Other ways of gathering this data can also be used.

The data that are collected for the panelist 112 are stored as television history data 122 and browsing history data 124. The television history data 122 describes, for each viewing device, television advertisements that were presented by use of the viewing device. Likewise, the browsing history data 124 describes, for each browsing device, web-based advertisements that were presented by use of the browsing device. The browsing history data 124 can also describe, for each browsing device, the browsing history of the device, which can include a list of properties of the advertisers that the user of the device visited using the device, and the times of those visits.

Also stored at the survey system 120 are survey and survey response data 126. The survey and survey response data 126 includes questions that are to be used in the surveys, rules for including or excluding certain questions in a survey, and the results that are received from the panelists in response to the surveys.

In operation, the survey system 120 determines, for each panelist, advertisements that were presented by use of the devices 114 and/or 116 associated with the panelist, and advertisements that were not presented by use of the devices 114 and/or 116 associated with the panelist. Thereafter, the survey system 120 selects a proper subset of the panelists. Each selected panelist in the proper subset of panelists is selected based on the determinations of television advertisements that were presented and television advertisements that were not presented by use of the devices 114 and 116 associated with the panelist. For each of the selected panelists, the survey system 120 generates a survey for the panelist. The survey includes one or more questions, and each of the questions is selected based on the advertisements that were presented and advertisements that were not presented by use of the devices 114 and 116 associated with the panelist. The system 120 provides the surveys to the panelist, and stores the received responses in the survey and survey response data 126. Thereafter, the television provider 104 and the advertisers 106 can access the response data for their respective surveys. The generation of the surveys, the processing of the survey responses, and the reports are described in more detail below.

§1.2 Example Survey System

Figure 2:
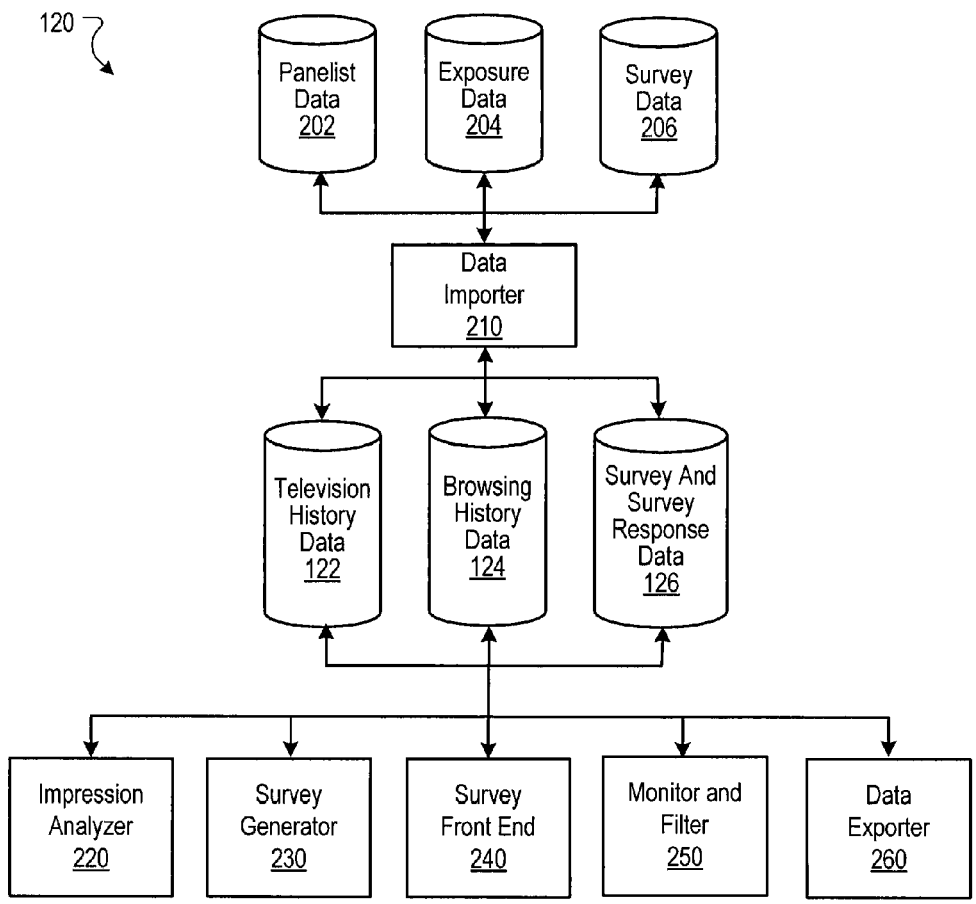
FIG. 2 is a block diagram of an example survey system.

FIG. 2 is a block diagram of an example survey system 120. The example survey system 120 includes a data importer 210, an impression analyzer 220, a survey generator 230, a survey front end 240, a monitor and filter 250 and a data exporter 260. The example architecture of FIG. 2 is illustrative only, and other software architectures can be used.

The data importer 210 receives panelist data 202, exposure data 204, and survey data 206, and formats the data for storage in the television history data 122, the browsing history data 124, and the survey and survey response data 126.

The panelist data 202 describes the panelists that are participating in advertisement surveys. Example panelist data describes demographics associated with each panelist, such as age, gender, income levels, and addresses, and includes identifiers to identify each panelist, such as an anonymized identifier that identifies a set top box and/or the computer associated with the panelist.

The exposure data 204 describes, for each panelist, television advertisements that were presented by use of viewing devices 114 associated with panelist, and web-based advertisements that were presented by use of computers 116 associated with panelist. These data are stored in the television history data 122 and the browser history data 124 in a common format for processing by the survey system 120.

The survey data 206 are provided by the television provider 104 and the advertisers 106. The survey data 206 describes advertisements and advertising campaigns for which surveys are desired by the advertisers 106, television programming channels and television programs forward surveys are desired by the television provider 104, and other parameters by which advertisement surveys may be defined by the television provider 104 and advertisers 106.

As will be described below, in some implementations, the panelist data 202, the exposure data 204 and the survey data 206 can be anonymized so that the data cannot be used to reveal the identity of the panelist. Thus, the description of determining or identifying which panelist was exposed or was not exposed to advertisements does not necessarily reveal the identity of the panelist; instead, the determining or identifying of the panelists can mean that the panelist is uniquely identified in an anonymous context such that the same panelist can be identified without revealing the panelist's identity.

In some implementations, the survey data 206 can also include rules for the surveys. For example, a particular survey for an advertiser may require that an initial survey be conducted prior to the commencement of an advertising campaign, and then continuing the survey after commencement advertising campaign. For example, the rules may require that the survey system 120 select a baseline survey for panelists that includes one or more questions directed to an offering of the advertising campaign. From the responses to the baseline survey, the survey system 120 can determine a bias or some other panelists characteristic. As used herein, a bias is knowledge, awareness, attitude, perception, or other behavioral aspect that can be measured and associated with an individual panelist or group of panelists. For example, an initial bias for brand recognition can be established prior to commencement of an advertising campaign, and a final bias for brand recognition can be measured after the advertising campaign has finished its run. The comparison of the two biases can be used to determine, for example, lift with respect to brand recognition that can be attributed to the advertising campaign.

The impression analyzer 220 accesses the television history data 122 and the browser history data 124 and determines, for each panelist, advertisements that were presented to the panelist by use of devices 114 and 116, and advertisements that were not presented to the panelist by use of devices 114 and 116. In some implementations, the browsing history data 124 includes data indicating which advertisements were presented to the panelist by use of computer devices 116. The television history data 122 include set top log records that indicate set top activity, such as data that identifies channel tunes, e.g., a channel identifier to which the set top box was tuned, and channel tune times, e.g., the times that the viewing device was tuned to a channel. The channel tune times can be compared to advertisement history data provided by the television provider 104 and detailing advertisements that were aired on channels and the times during which the advertisements were aired, to determine which television advertisements were presented by use of televisions 114.

In some implementations, the impression analyzer 220 defines one or more criteria for viewing interactions that must be met to count an impression for a television commercial and attribute the impression to a panelist. Viewing interactions are interactions recorded for in the television history data, e.g., channel changes, volume adjustments, etc. For example, the impression analyzer 220 processes set top logs reported by set top boxes to identify viewing interactions that occurred during advertisement spots. An impression can be counted when the television history data indicates the set top box was tuned to a broadcast stream in which an advertisement was inserted during the advertisement spot, and the set top box device remained tuned to the broadcast stream for N consecutive seconds during the actual display time of the insertion. Likewise, other impression criteria can also be used. For example, an impression can based on an advertisement exposure, e.g., a brief exposure of an advertisement, or a full viewing of the advertisement, of a threshold viewing in between, e.g., five seconds, or five seconds of the first fifteen seconds; or a percentage of the advertisement viewed, etc.

The impression analyzer 220 can also filter impression based on one or more filtering rules, such as dwell time filtering and idle filtering. Dwell time filtering determines if corresponding tune times for a channel tune define a duration exceeding a minimum dwell time threshold, and upon a positive determination, associate the corresponding tune times for the channel tune as a reliable duration. For example, if a panelist is channel surfing, the panelist may generate many tuning events that indicate the panelist has was not paying attention to the channel, and therefore did not pay attention to an advertisement that may have aired. If the dwell time of any viewing is less than a certain dwell time threshold, e.g., two seconds, five seconds, etc., the channel tunes can be considered a channel surfing event in which the panelist did not pay attention to the advertisement, and thus an impression would not be generated.

Idle filtering determines if corresponding tune times for a channel tune define a duration that exceeds a maximum dwell time threshold, and upon a positive determination, associates the corresponding tune times for the channel tune as a false-positive duration. For example, common usage patterns are turning off a television while leaving the set top box on; leaving a room for an extended time while the television remains on; and falling asleep during a television program. Consequently, television history data that indicates a panelist was watching the same channel for an extended time without changing the channel, e.g., four hours, may generate many false positive impressions, as the panelist may have turned off the television, left the room, or fallen asleep. Thus, impressions that occur after the maximum dwell time threshold are not counted.

In some implementation, idle filtering parameters are adjusted based on a corresponding programming event. For example, a maximum dwell time threshold can be set in substantial proportion to a programming event, e.g., a 30 minute programming event can have a maximum dwell time of 30 minutes; a three hour sporting event can have a maximum dwell time of three hours, etc. In another implementation, the maximum dwell time threshold can be adjusted based on an aggregate length of programming events. For example, four 30 minute programming events may have a corresponding maximum dwell time of 45 minutes. Thus, if the television history data indicates that during a broadcast of four half-hour sitcoms the set top box was not changed, impressions will not be generated for viewings beyond the initial 45 minute dwell time.

Idle filtering can also be adjusted based on panelist behavior during previous programming. For example, idle history times can be based on panelist behavior collected over time, e.g., an idle filter time for a first program or program content (e.g., television news talk programs) may be 15 minutes; while an idle history time for a second program or program content (e.g., a three hour long program) may be two hours based on historical panelist behavior.

The impression analyzer 220 can process the browsing history data 124 in a similar manner, applying one or more criterion to determine whether to attribute an impression to a panelist for an advertisement that is shown on a browsing device.

In other implementations, the impression analyzer 220 can be omitted, and the television history data 122, the browsing history data 124, and the impression for each can be provided by third parties, or can be provided by another system separate from the survey system 120.

The impression analyzer 220 can further process the determined impressions from the television history data 122 and the browsing history data 124 to determine panelists behavior for both television and Internet usage over time, and can correlate the behavior over time by matching time stamps in the television history data 122 and the browsing history data 124. By doing so, the impression analyzer 220 provides measurement data to the survey system 120 that allows the survey system 120 to measure the effect of advertisements on disparate groups of panelist, each of which having been exposed to a campaign in different ways.

For example, brand recognition can be measured for panelists that have been exposed to a campaign by television advertisements only, by web-based advertisements only, and by both television advertisements and web-based advertisements, and an aggregate measure of brand recognition can also be measured for all panelists exposed to the advertisements. Furthermore, the differences in the measurements and size of the groups can be used to determine which advertisements—web based or television based—are most effective in achieving a particular advertising goal.

The impression analyzer 220 can also be used to identify particular behavioral demographics. For example, the impression analyzer 220 can identify groups of panelists that stop watching a particular sports analysis program after the conclusion of a sports season; groups of panelists that tend to browse the Internet while watching television; and groups of panelists that tend to watch television during only certain hours of the day.

The survey generator 230 generates surveys for panelists and stores the surveys in the survey and survey response data 126. In some implementations, the survey are generated according to rule sets that define which questions are to be included in or excluded from a survey for a panelist based on the exposure data 204 for that panelist. When generating surveys, the generator 230 takes into account the television history data 122, the browsing history data 124, the survey generation rules and other requirements. For example, as described above, the survey generation rules may cause the survey generator 230 to generate surveys for panelists that are to be provided before the commencement of an advertising campaign. After commencement of the advertising campaign, the survey generator 230 determines which of the panelists that received the baseline survey have been presented advertisements that are to be surveyed by use the devices 114 and 116, and which of the panelists have not been presented advertisements by use of the devices 114 and 116. These respective panelists are grouped into corresponding proper subsets, and separate surveys are generated for each proper subset according to the survey generation rules. For example, in the first proper subset of panelists that are associated with devices on which television advertisements subject to the survey were presented, the panelists can be broken down by the number of expected exposures, and different survey questions can be provided to each panelist based on the expected numbers exposures.

Continuing with the example, panelists that are determined to have been potentially exposed to 10 more advertisements of a particular campaign (i.e., the devices associated with panelists were used to present advertisements associated with the campaign at least 10 times), may be asked a first set of questions, while panelists that are determined to have been potentially exposed to 1-5 advertisements of the particular campaign may be asked a second set of different questions. Finally, panelists that are determined to have no potential exposures to advertisements of the particular campaign (i.e., from the devices associated with panelists were not used to present advertisements associated with the campaign) may be asked a third set of questions that are different from the questions in the first and second sets of questions. Alternatively, all of the panelists may be asked the same questions.

In some implementations, surveys are generated based on both advertisements that were presented and advertisements that were not presented by use of the devices 114 and/or 116 of the panelists. For example, the survey generator 230 can generate a survey relating to at least three advertisements a panelist has seen in the last week, and three advertisements that the panelists could not have seen in the last two week by use of the devices 114 and 116.

In some implementations, the survey generator 230 can also take into account the properties that the panelists visited by use of the computer 116 associated with the panelists. The list of properties can be obtained from the browser history data 124 associated with the panelists. The survey generation rules can defines rules that, for example, may attribute knowledge about the advertisement or product/service/brand being advertised based solely on secondary exposures, e.g., based on the properties having been visited more than a threshold number of times. For example, a particular group of panelists may not have been exposed to a particular advertising campaign, but their correspond browser history indicates that each of the panelists in the group may have visited several web properties of the advertiser multiple times, and each of properties relate to products or brands being advertised by the campaign. Accordingly, the survey generation rules may cause the survey generator 230 to exclude questions relating to brand lift and recognition from the surveys for these panelists so as not to skew the derived effect of brand lift that is attributed to the campaign.

The survey generator 230 may also generate surveys according to a number of additional rules. For example, survey generation rules can be defined to limit the number of questions that are asked to the panelists to preclude contamination of the panel, to require the asking of at least enough questions to be able to generate statistically valid data, and to incorporate rules defined by the television provider 104 and or the advertisers 106. Likewise, the survey generation rules may cause surveys to be further generated based on one or more of the behavior demographics or other demographics described above.

The survey front end 240 accesses surveys for panelists stored in the survey and response data 126, and provides the surveys to the panelists over the network 102. For example, the surveys may be presented in the form of a webpage on a client device or as an interactive menu on the television device. The surveys can also allow the panelist provide feedback in addition to the questions, such as if the panelist thought the advertisement was effective, offensive, etc.

In some implementations, if the panelist are managed by a separate panel manager 110, the survey front end 240 can provide the computer device of the panelists with a URL along with query parameters that identify the survey, the panelist, and the status (survey completed, abandoned, etc.) as well as a hashed key that will ensure that a panelists or malicious party cannot simply construct the URL without really taking the survey. The redirection to the panel manager 110 allows the panel manager to log particular data for the panelist. In implementations in which the survey system is also the panel manager, the survey front end 240 need not include this capability.

The monitor and filter 250 provides monitoring and filtering functionality. The filtering functionality can be used to exclude advertisements from surveys, exclude particular panelists from surveys, and to reverse such exclusions. The exclusions can be selected by users, or can be based on a rule set. With respect to the latter, an example rule set can be based on demographics. For example, the particular rule set may exclude a set of advertisements from being surveyed by male panelists under 30.

The monitoring functionality allows the television provider 104 and the advertisers 106 to monitor the progress of surveys. For example, the monitoring functionality allows a user to view how a survey will appear, to set up or remove exclusions, and to monitor the progress of the survey during a campaign.

Figure 5:
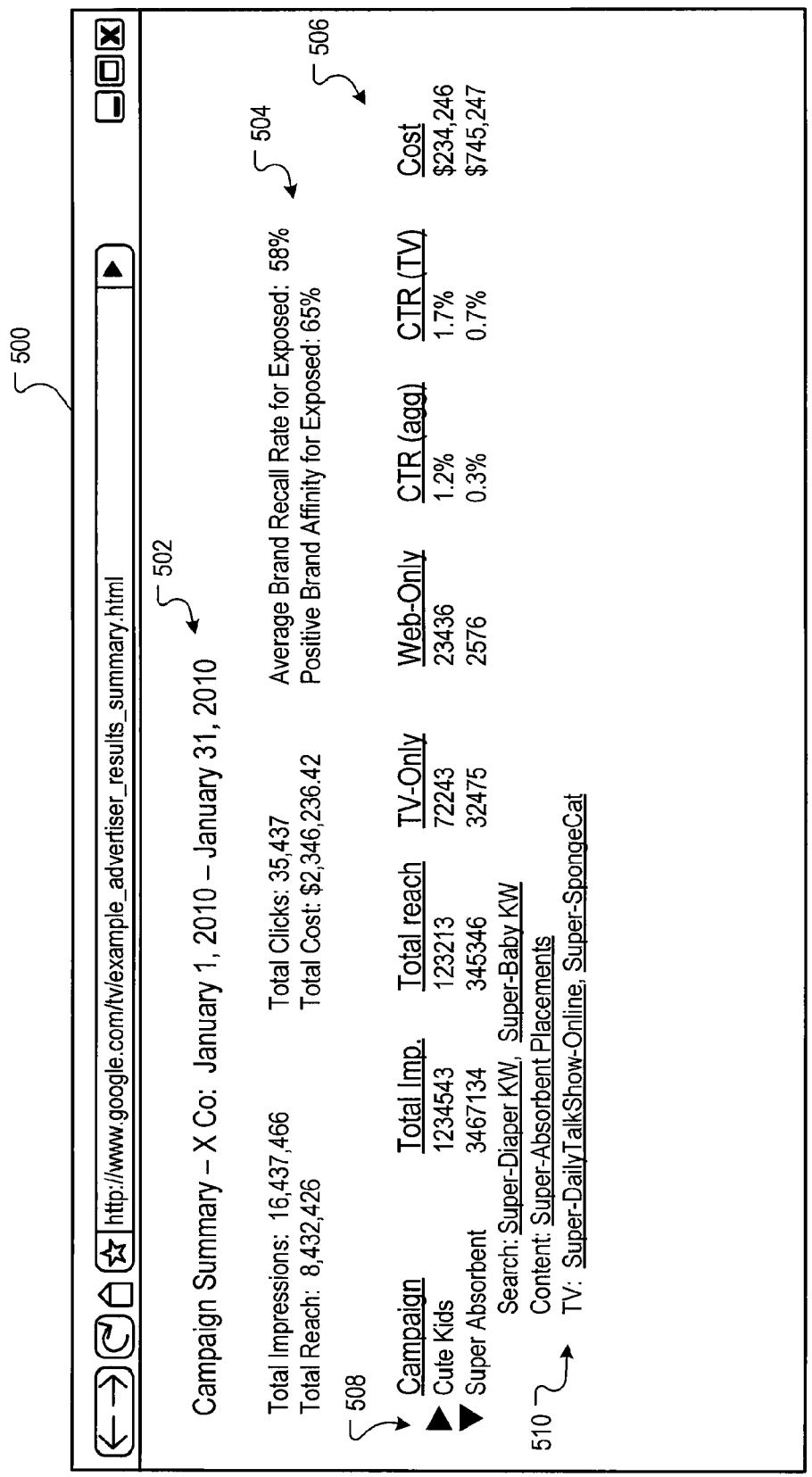
FIG. 5 is an illustration of a survey results summary page for an advertiser.
Figure 6:
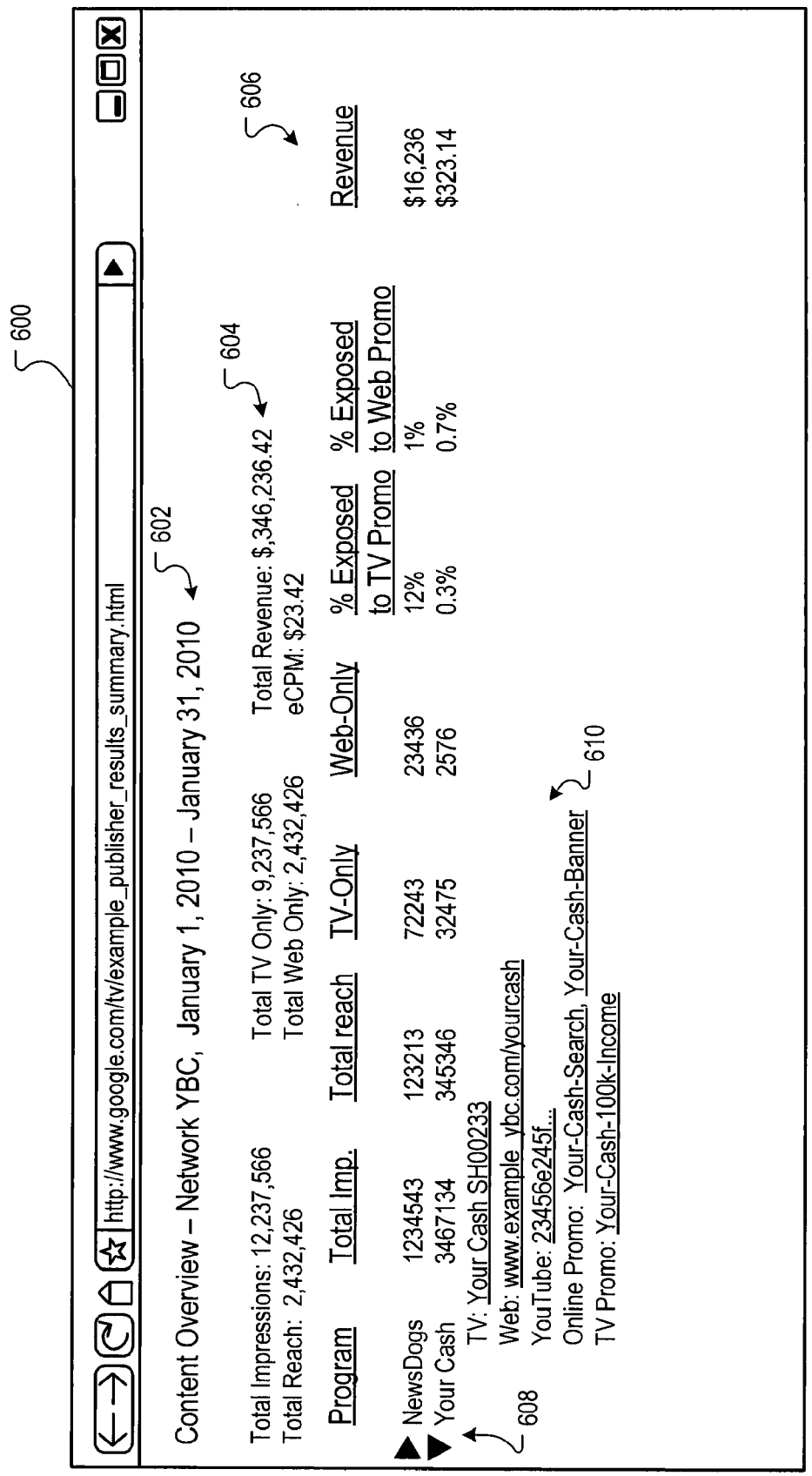
FIG. 6 is an illustration of a survey results summary page for a publisher.

The data exported 260 provide survey results to the advertisers 106, the television provider 104, and provides panelist data to the panel manager 110. The survey results can be provided in the forms of reports, examples of which are shown in FIGS. 5 and 6. The panelist data describes panelist performance, such as how often the panelist will engage the survey, the completion rate of a survey by the panelists, etc.

§2.0 Example Survey Process Flows

Figure 3:
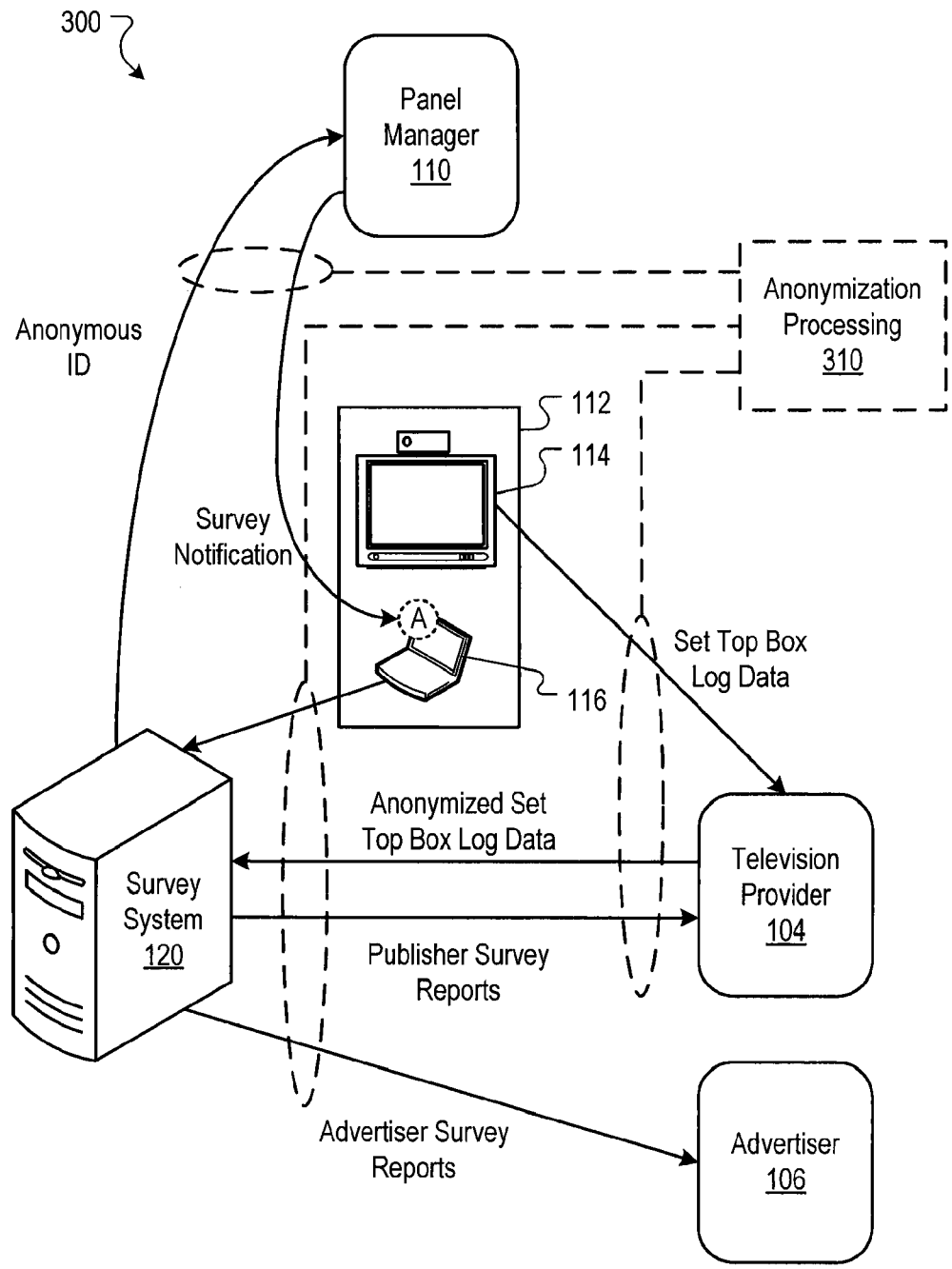
FIG. 3 is a block diagram of an example survey process.

FIG. 3 is a block diagram of an example survey process 300. The example survey process 300 is described in the context of the panel manager 110 that is a separate entity from the survey system 120. Although shown as a separate entity, the panel manager 110 can, in some implementations, be the same entity that is maintaining the survey system 120.

In some implementations, anonymization processing 310 is implemented to protect the privacy of panelists and to help maintain the integrity of the survey process. In particular, the anonymization process ensures that the viewing history of a panelist and the corresponding survey data for the panelist cannot be used to reveal the identity of the particular panelist. Accordingly, even though the panelist has volunteered to partake in surveys, the privacy of the panelist is still protected.

The anonymization processing 310 can be done centrally, e.g., the survey system 120 can implement the anonymization processing 310, or can be distributed, e.g., each of the television provider 104, panel manager 110 and the survey system 120 can implement respective portions of the anonymization processing 310. Accordingly, the anonymization processing 310 is illustrated as functional process that can be singularly implemented by a single entity or distributively implemented by multiple entities. A variety of anonymization processes and privacy protection schemes can be used, such as unique associations of panelists with random numbers, hashing of panelist identifiers, and encryption of the television history data 122 and the browsing history data 124.

In some implementations, the panelist has the option to withdrawal from the survey process at any time, and can specify that upon withdrawal all viewing information and web traffic information associated with the panelist, be deleted.

In operation, the survey system 120 receives set top box log data from the television provider 104, and receives web history data from panelist devices 116. The data are used to determine which advertisements have been presented and which advertisements have not been presented by use of the devices 114 and 116 for each panelist 112, as described above. At various points in time, the panelists are contacted for surveys. For example, the panel manager 110 may send the survey notification to a computer 116 associated with panelist. The panelist may respond to the survey, and the responses are sent to the survey system 120. The survey system 120 then sends a notification to the panel manager that notifies the panel manager that the panelist completed the survey. The survey system 120 can optionally send reporting data that provide specifics (e.g., percentage completed, responses, etc.) with respect to the panelist and the survey.

Responses to the surveys are processed and stored in the survey system 120. The television provider 104 can access the survey system 120 to receive publisher survey reports, and the advertisers can access the survey system 120 to receive advertiser survey reports.

§3.0 Use Cases

The survey system 120 is configured to limit the number of times particular panelists are contacted. For example, the survey system 120 may only be allowed to contact any particular panelists up to a maximum frequency count (e.g., no more than twice per week), and generates surveys that are not of excessive duration (e.g., 10 min or less per week total for any given panelists).

Optionally, the survey system 120 maintains diversity in survey questions so that panelists are not bored by surveys that consist entirely of the same type of question, or by being presented with repeated survey questions with each survey. For example, the survey system 120 can classify the questions according to types, and can limit the types of questions presented to a particular panelist during any time period.

The survey system 120 provides advertisers 106 with qualitative feedback on the progress and effectiveness of their advertisements and advertising campaigns. Such qualitative feedback includes feedback related to brand familiarity (does the panelist know or has the panelist heard about a product), advertisement recall (does the panelist remember seeing the advertisement, and does the panelist remember where he or she saw the advertisement), unaided brand recall (is the panelist able to provide the name of the product being advertised in a free-form text field), aided brand recall (is the panelist able to provide the name of a product when given a hint by product image or commercial), brand affinity (does the panelist have positive feelings towards the product being advertised), purchase intent (does the panelist intend to purchase the product being advertised), purchase history (has the panelist historically purchased the product being advertised, or products in the same category), to name just a few.

By use of the survey system 120, the advertisers 106 can specify that surveys be deployed only to those panelists that provide the most informative responses to surveys. This can include limiting surveys to panelists that have likely been exposed to the advertiser's commercials (whether on the television, on the Internet, or both), and limiting surveys to panelists that match a particular demographic of interest.

The survey system 120 can also provide reports to the television provider 104 and the advertiser 106 summarizes survey results broken down by categories such as those described above can also by other parameters. Examples of these other parameters include the number, location, and frequency of exposures. With respect to the frequency of exposures, the parameter can be based on panelist answers or based on the number of times that the devices 114 and 116 were actually used to present advertisements subject to the survey. As described above, the panelists' recollection of the number of times that he or she has viewed the advertisement may differ from the number of times of devices 114 and 116 were actually used to present advertisements that are subject to the survey.

§4.0 Example Process Flow

Figure 4A:
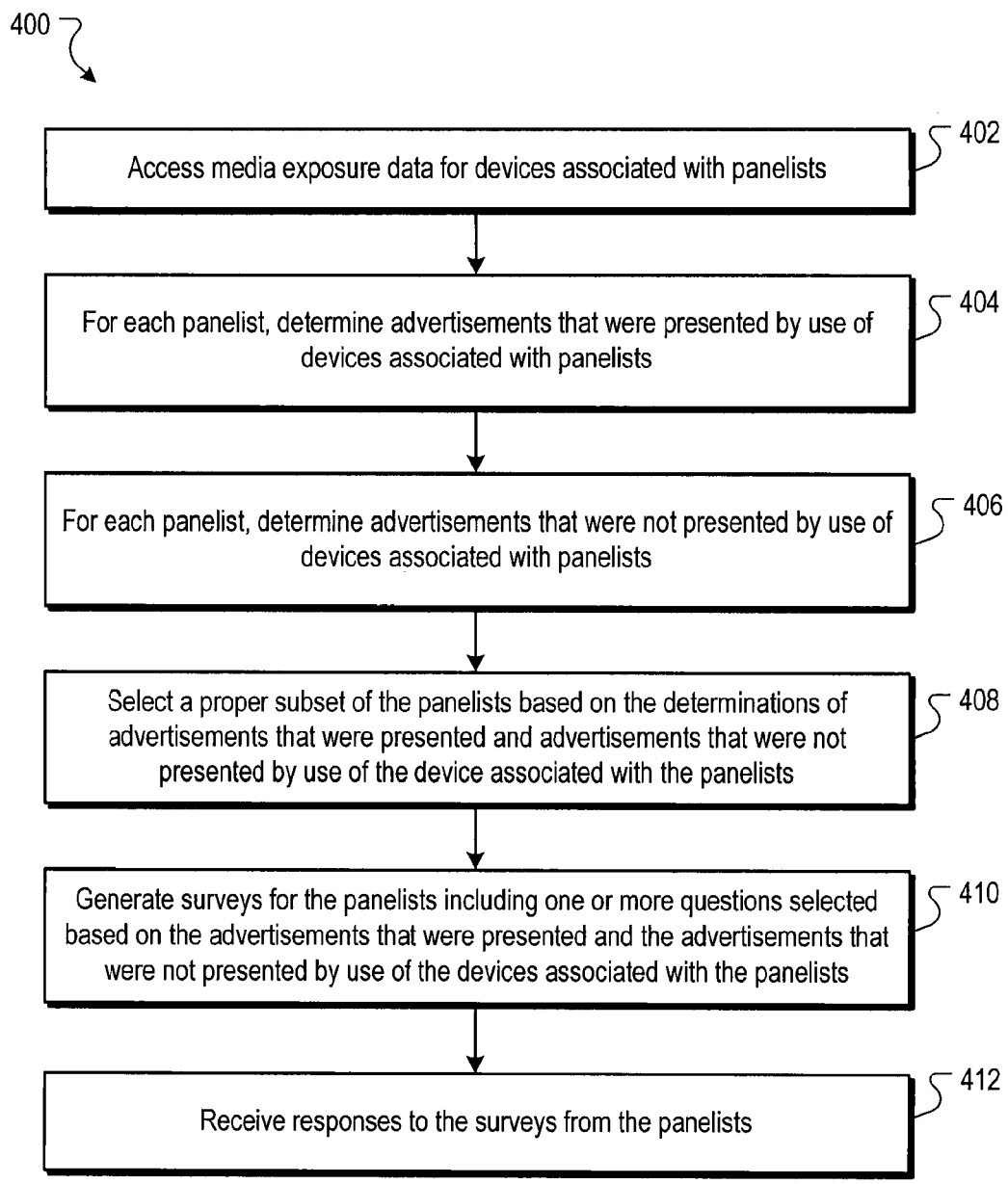
FIG. 4A is a flow chart of an example process of conducting a survey that is customized based on media exposure.

FIG. 4A is a flow chart of an example process 400 of conducting a survey that is customized based on media exposure. The process 400 can be implemented in the survey system 120 of FIGS. 1 and 2.

The process 400 accesses media exposure data for devices associated with panelists (402). For example, the process 400 accesses television history data 122 and/or browsing history data 124 associated with the panelists.

For each panelist, the process 400 determines advertisements that were presented by use of devices associated with the panelists (404), and determines advertisements that were not presented by use of devices associated with panelists (406). For example, the exposure data may describe, for each device, advertisements that were presented by use of the device. From this data, the process 400 can determine which advertisements may have been viewed by panelists by use of the devices associated with panelist, and which advertisements could not have been viewed by the panelists by use of the devices associated with the panelist. In some implementations, the advertisements that are determined to be presented by use of devices associated with the panelists are also advertisements for which impressions are determined to have occurred according to the meeting of one or more criteria for viewing interactions.

The process 400 selects proper subset of the panelists based on the determination of advertisements that were presented and advertisements that were not presented by use of the devices associated with panelists (408). For example, panelists can be grouped into groups that may have viewed particular advertisements, and groups that could not have viewed particular advertisements.

The process 400 generates surveys for the panelist including one or more questions selected based on the advertisements that were presented and the advertisements that were not presented by use of the devices associated with panelist (410). For example, a particular panelist may have viewed several advertisements for first campaign, and may not have viewed any advertisements associated with a second campaign. Accordingly, a survey may be generated for the panelist that includes questions related to unaided recall and brand awareness for the product offered by the first campaign, and includes questions only related to aided brand recall for products offered by the second campaign.

The process 400 receives responses to the surveys for the panelists (412). For example, the survey system 120 may provide the surveys to the panelists, and when the panelists participate in surveys, the responses are sent to the survey system 120. Once received, the survey system 120 processes the responses to determine survey results and generate reports.

Figure 4B:
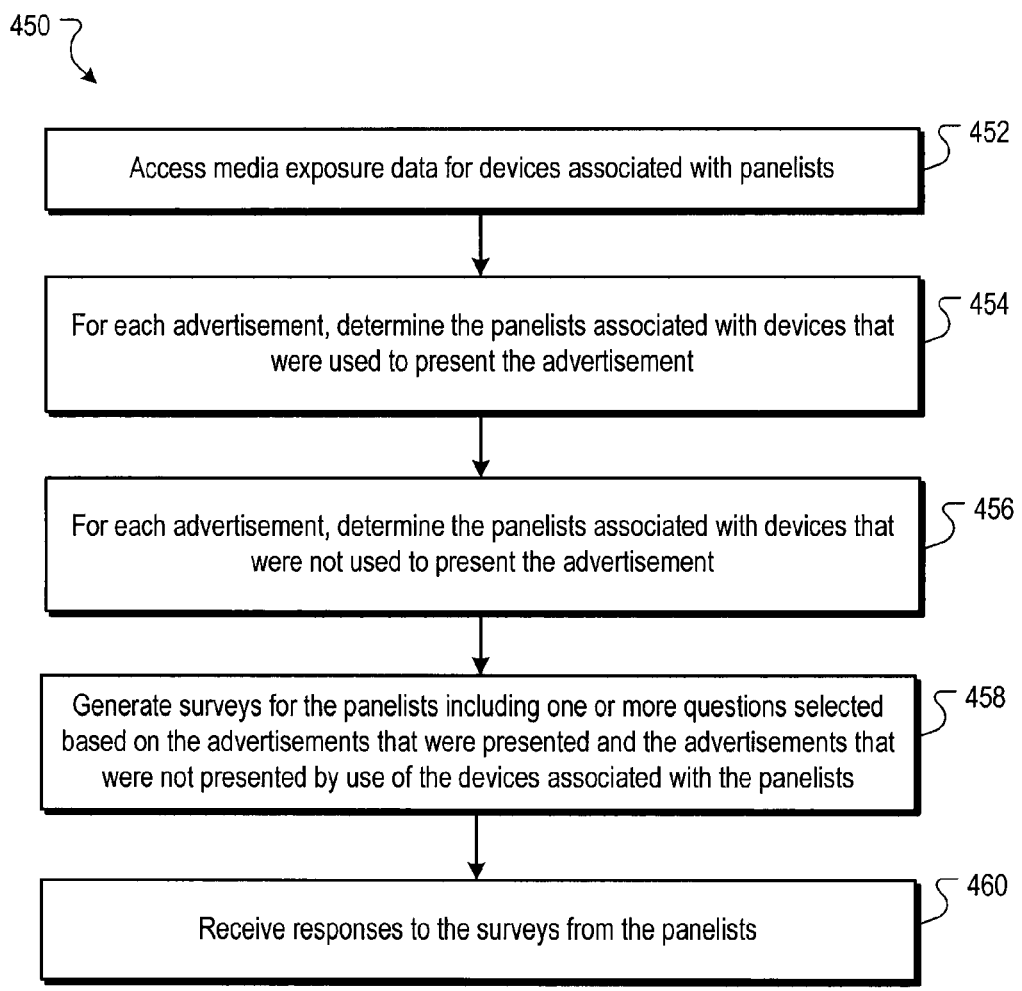
FIG. 4B is a flow chart of another example process of conducting a survey that is customized based on media exposure.

FIG. 4B is a flow chart of another example process 450 of conducting a survey that is customized based on media exposure. The process 450 can be implemented in the survey system 120 of FIGS. 1 and 2, and is similar to the process 400, except that advertisements are used to initially select panelists for surveys.

The process 450 accesses media exposure data for devices associated with panelists (452). For example, the process 450 accesses television history data 122 and/or browsing history data 124 associated with the panelists.

For each advertisement, the process 450 determines the panelists associated with devices that were used to present the advertisement (454), and determines the panelists associated with devices that were not used to present the advertisement (456). In some implementations, the panelists that are determined to be associated with devices that were used to present the advertisement are also panelists for which impressions are determined to have occurred according to the meeting of one or more criteria for viewing interactions.

The process 450 then generates surveys for the panelist including one or more questions selected based on the advertisements that were presented and the advertisements that were not presented by use of the devices associated with panelists (458).

The process 450 receives responses to the surveys for the panelist (460). For example, the survey system 120 may provide the surveys to the panelists, and when the panelists participate in surveys, the responses are sent to the survey system 120. Once received, the survey system 120 processes the responses to determine survey results and generate reports.

§5.0 Example Survey Reports

FIG. 5 is an illustration of a survey results summary page 500 for an advertiser. The summary page 500 is generated by the survey system 120 is provided to an advertiser 106. The summary page 500 summarizes survey results for various advertising campaigns for an advertiser 106, and includes a summary title 502 that specifies the dates for which the survey results apply. The summary page 500 also includes survey metrics 504, which summarizes various survey results for the surveys.

A campaign listing 506 lists the various campaigns that have been surveyed for the advertiser, and list the different metrics that are measured from the survey results. For example, the survey results measure, for each campaign, the number of impressions for the campaign, the total impressions for the campaign, the breakout of impressions according to mediums (e.g., television and web-based advertisements), an aggregate click through rate of web-based advertisements of all panelist, a click through rate of web-based advertisements of panelists that have seen an advertisement for the campaign on both the web-based medium and the television medium, and the total cost for the campaign.

Each campaign has an associated expansion tab 508, the selection of which causes the summary page 500 to display various breakout metrics 510 associated with particular campaign. For example, the breakout metrics 510 include selectable links that respectively provide, upon selection, metrics related to search engine based advertisements targeted on particular keywords, content-based advertisements targeted to particular webpages, and television-based advertisements targeted to particular television programs.

The survey results shown in the summary page 500 are illustrative only, and more or fewer survey results can be shown. For example, brand recognition, brand affinity, and recall metrics can also be provided. Furthermore, as with the click through rate, these other metrics can be broken down by medium, and the effect of one medium on another can be measured. For example, brand recognition metrics can be provided for panelists that have only seen web-based advertisements for the particular campaign, for panelists that have only seen television advertisements for the particular campaign, and for panelists that have seen both web-based and television advertisements for the particular campaign. The relative differences in the metrics can also be calculated, and from these differences, the advertiser can discern the relative effects of advertising in one or both mediums.

FIG. 6 is an illustration of a survey results summary page 600 and for a publisher. The summary page 600 is generated by the survey system 120 and is provided to a publisher, e.g., a television provider 104. The summary page 600 summarizes survey results for various advertisements presented on channels provided by the publisher, and includes a summary title 602 that specifies the dates for which the survey results apply. The summary page 600 also includes survey metrics 604, which summarize various survey results for the surveys.

A program listing 606 lists the various programs for which advertisements that have been presented have been surveyed, and lists the different metrics that are measured from the survey results. For example, the survey results measure, for each program, the number of impressions for the program, the total impressions and total reach for the program, the breakout of impressions according to mediums (e.g., television and web-based advertisements). The publisher can use these particular statistics when selling or pricing advertising spots for particular programs.

Additional statistics can include the percentage of panelists exposed to television promos for the program on television and the percentage of panelists exposed to television promos for the program on a web-based medium, and the estimated revenue from advertisements that aired during the program. These particular statistics are typically used for internal publisher review and promotion strategy.

Each program has an associated expansion tab 608, the selection of which causes the summary page 600 to display various breakout metrics 610 associated with particular programs. For example, the breakout metrics 610 related to different properties for a program, and include selectable links that respectively provide, upon selection, metrics related to a particular episode of a program that aired on the network, metrics related to web content for a web page for the program, metrics related to program content provided by a web-based content provider, and metrics related to web-based promotions and television based promotions for the program.

As with the summary page 500, the survey results shown in the summary page 600 are illustrative only, and more or fewer survey results can be shown.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    accessing television history data for viewing devices, each of the viewing devices being associated with a corresponding panelist, the television history data describing, for each viewing device, television advertisements that were presented by use of the viewing device;
    determining, for each panelist, television advertisements that were presented by use of the viewing device associated with the panelist;
    determining, for each panelist, television advertisements that were not presented by use of the viewing device associated with the panelist;
    selecting a proper subset of the panelists, each selected panelist in the proper subset of panelists being selected based on the determinations of television advertisements that were presented and television advertisements that were not presented by use of the viewing device associated with the panelist;
    for each of the selected panelists, generating a survey for the panelist, the survey including one or more questions, each of the questions having been selected based on the television advertisements that were presented and television advertisements that were not presented by use of the viewing device associated with the panelist, wherein generating a survey comprises generating a survey directed to an advertising campaign comprising determining, for a panelist, a category, based on a count of a number of different advertisements of the advertisement campaign to which the panelist was potentially exposed, wherein the selected questions are based on the determined category; and
    receiving responses to the selected surveys from the selected panelists.

2. The method of claim 1, wherein:
    the surveys are directed to an advertising campaign that includes one or more television advertisements; and
    prior to a commencement of the advertising campaign:
        selecting a baseline survey for each selected panelist, the baseline survey including one or more questions directed to an offering of the advertising campaign; and
        receiving responses to the selected baseline surveys from the selected panelists; and
        determining, from the responses to the baseline surveys, first response biases.

3. The method of claim 2, wherein:
    after commencement of the advertising campaign:
        selecting a proper subset of the panelists comprises selecting a first proper subset of panelists, each of the panelists in the first proper subset being determined to have a television advertisements belonging to the campaign presented by use of the viewing device associated with the panelist; and
        generating a survey for the panelist comprises generating a first survey for the panelists of the first proper subset, the first survey including a first set of questions, each of the first questions having been selected based on the television advertisements belonging to the campaign that were presented.

4. The method of claim 3, wherein:
    after commencement of the advertising campaign:
        selecting a proper subset of the panelists comprises selecting a second proper subset of panelists, each of the panelists in the second proper subset being determined to not have had a television advertisements belonging to the campaign presented by use of the viewing device associated with the panelist; and
        generating a survey for the panelist comprises generating a second survey for the panelists of the second proper subset.

5. The method of claim 4, wherein the second survey includes the first set of questions, and further comprising determining, from the responses to the baseline surveys, the first surveys, and the second surveys, second response biases.

6. The method of claim 1, further comprising:
    accessing browsing history data for browsing devices, each of the browsing devices being associated with a corresponding panelist, the browsing history data describing, for each browsing device, web-based advertisements that were presented by use of the browsing device;
    determining, for each panelist, web-based advertisements that were presented by use of the browsing device associated with the panelist;
    determining, for each panelist, web-based advertisements that were not presented by use of the browsing device associated with the panelist; and
    wherein each selected panelist in the proper subset of panelists is further selected based on the determinations of web-based advertisements that were presented and web-based advertisements that were not presented by use of the browsing device associated with the panelist.

7. The method of claim 6, wherein:
    the advertising campaign includes one or more television advertisements and one or more web-based advertisements; and
    prior to a commencement of the advertising campaign:
        selecting a baseline survey for each selected panelist, the baseline survey including one or more questions directed to an offering of the advertising campaign; and
        receiving responses to the selected baseline surveys from the selected panelists; and
        determining, from the responses to the baseline surveys, first response biases.

8. The method of claim 7, wherein:
    after commencement of the advertising campaign:
        selecting a proper subset of the panelists comprises selecting a first proper subset of panelists, each of the panelists in the first proper subset being determined to have one or more of a television advertisement or web-based advertisement belonging to the campaign presented by use of the viewing device or the browsing device associated with the panelist; and generating a survey for the panelist comprises generating a first survey for the panelists of the first proper subset, the first survey including a first set of questions, each of the first questions having been selected based on the television advertisements or web-based advertisements belonging to the campaign that were presented.

9. The method of claim 8, wherein:

after commencement of the advertising campaign:

selecting a proper subset of the panelists comprises selecting a second proper subset of panelists, each of the panelists in the second proper subset being determined to not have had either of a television advertisement or web-based advertisement belonging to the campaign presented by use of the viewing device or the browsing device associated with the panelist; and generating a survey for the panelist comprises generating a second survey for the panelists of the second proper subset.

10. The method of claim 1, wherein the surveys are directed to an advertising campaign that includes one or more television advertisements; and selecting a proper subset of the panelists comprises selecting a first proper subset of panelists, each of the panelists in the first proper subset being determined to have a television advertisements belonging to the campaign presented by use of the viewing device associated with the panelist, and selecting a second proper subset of panelists, each of the panelists in the second proper subset being determined to not have had a television advertisement belonging to the campaign presented by use of the viewing device associated with the panelist;

generating a survey for the panelist comprises generating a first survey for the panelists of the first proper subset, the first survey including a first set of questions, each of the first questions having been selected based on the television advertisements belonging to the campaign that were presented;

generating a survey for the panelist comprises generating a second survey for the panelists of the second proper subset.

11. The method of claim 1, wherein generating a survey comprises:

determining, for a panelist, a first minimum number of advertisements that each were presented during a previous time period by use of the viewing device associated with the panelist; and including in the survey questions that are directed to each of the first minimum number of advertisements.

12. The method of claim 1, wherein generating a survey comprises:

determining, for a panelist, a first minimum number of advertisements that each were not presented during a previous time period by use of the viewing device associated with the panelist; and including in the survey questions that are directed to each of the first minimum number of advertisements.

13. The method of claim 12, wherein generating the survey comprises:

determining, for the panelist, a second minimum number of advertisements that each were presented during the previous time period by use of the viewing device associated with the panelist; and including in the survey questions that are directed to each of the second minimum number of advertisements.

14. The method of claim 1, wherein selecting a proper subset of the panelists comprises selected each panelist based on impressions attributed to the panelist for television advertisements that were presented by use of the viewing device associated with the panelist, each impression having been attributed to the panelists in response to a meeting of a viewing interaction criterion.

15. The method of claim 14, wherein the impression is a count of a viewing of a television advertisement.

16. A method performed by data processing apparatus, the method comprising:

accessing exposure data for devices, each of the devices being associated with a corresponding panelist, the exposure data describing, for each device, advertisements that were presented by use of the device, and for each panelist, advertisements that were presented by use of the device associated with the panelist and advertisements that were not presented by use of the device associated with the panelist;

selecting a proper subset of the panelists, each selected panelist in the proper subset of panelists being selected based on the determinations of advertisements that were presented and advertisements that were not presented by use of the device associated with the panelist;

for each of the selected panelists, generating a survey for the panelist, the survey including one or more questions, each of the questions having been selected based on the advertisements that were presented and advertisements that were not presented by use of the device associated with the panelist, wherein generating a survey comprises generating a survey directed to an advertising campaign comprising determining, for a panelist, a category, based on a count of a number of different advertisements of the advertising campaign to which the panelist was potentially exposed, wherein the selected questions are based on the determined category; and receiving responses to the selected surveys from the selected panelists.

17. The method of claim 16, wherein:

the viewing devices include set top boxes and browsing devices;

the exposure data comprises television history data and browsing data, wherein:

the television history data describes, for each set top box, television advertisements that were presented by use of the device; and the browsing history data describes, for each browsing device, web-based advertisements that were presented by use of the browsing device.

18. A method performed by a data processing apparatus, comprising:

accessing exposure data for devices, each of the devices being associated with a corresponding panelist, the exposure data describing, for each device, advertisements that were presented by use of the device;

determining, for each advertisement, the panelists associated with devices that were used to present the advertisement;

determining, for each advertisement, the panelists associated with devices that were not used to present the advertisement;

generating, for at least one of the panelists, a survey for the panelist, the survey including one or more questions selected based on the advertisements that were presented and the advertisements that were not presented by use of the devices associated with panelist, wherein generating a survey comprises generating a survey directed to an advertising campaign comprising determining, for a category, based on a count of a number of different advertisements of the advertising campaign to which the panelist was potentially exposed, wherein the selected questions are based on the determined category; and receiving responses to the survey from the panelist.

19. A method performed by data processing apparatus, the method comprising:

accessing exposure data for devices, each of the devices being associated with a corresponding panelist, the exposure data describing, for each device, advertisements that were presented by use of the device;

determining, for each panelist, advertisements that were presented by use of the device associated with the panelist and for which one or more impressions are attributed to the panelist;

determining, for each panelist, advertisements for which impressions are not attributed to the panelist;

selecting a proper subset of the panelists, each selected panelist in the proper subset of panelists being selected based on the advertisements for which impressions are attributed to the panelist and advertisements for which impressions are not attributed to the panelist;

for each of the selected panelists, generating a survey for the panelist, the survey including one or more questions, each of the questions having been selected based on the on the advertisements for which impressions are attributed to the panelist and advertisements for which impressions are not attributed to the panelist, wherein generating a survey comprises generating a survey directed to an advertising campaign comprising determining, for a panelist, a category, based on a count of a number of different advertisements of the advertising campaign to which the panelist was potentially exposed, wherein the selected questions are based on the determined category; and receiving responses to the selected surveys from the selected panelists.

20. A system, comprising:

a data processing apparatus;

a computer storage device storing instructions that when executed by data processing apparatus cause the data processing apparatus to perform operations comprising:

receiving television history data for viewing devices, each of the viewing devices being associated with a corresponding panelist, the television history data describing, for each viewing device, television advertisements that were presented by use of the viewing device and, for each panelist, television advertisements that were presented by use of the viewing device associated with the panelist, and television advertisements that were not presented by use of the viewing device associated with the panelist;

selecting a proper subset of the panelists, each selected panelist in the proper subset of panelists being selected based on the determinations of television advertisements that were presented and television advertisements that were not presented by use of the viewing device associated with the panelist;

for each of the selected panelists, generating a survey for the panelist, the survey including one or more questions, each of the questions having been selected based on the television advertisements that were presented and television advertisements that were not presented by use of the viewing device associated with the panelist, wherein generating a survey comprises generating a survey directed to an advertising campaign comprising determining, for a panelist, a category, based on a count of a number of different advertisements of the advertising campaign to which the panelist was potentially exposed, wherein the selected questions are based on the determined category; and receiving responses to the selected surveys from the selected panelists.

21. A system, comprising:

a data processing apparatus;

a computer storage device storing instructions that when executed by data processing apparatus cause the data processing apparatus to perform operations comprising:

accessing exposure data for devices, each of the devices being associated with a corresponding panelist, the exposure data describing, for each device, advertisements that were presented by use of the device;

determining, for each advertisement, the panelists associated with devices that were used to present the advertisement;

determining, for each advertisement, the panelists associated with devices that were not used to present the advertisement;

generating, for at least one of the panelists, a survey for the panelist, the survey including one or more questions selected based on the advertisements that were presented and the advertisements that were not presented by use of the devices associated with panelist, wherein generating a survey comprises generating a survey directed to an advertising campaign comprising determining, for a panelist, a category, based on a count of a number of different advertisements of the advertising campaign to which the panelist was potentially exposed, wherein the selected questions are based on the determined category; and receiving responses to the survey from the panelist.

* * * * *